United States Patent Office 3,360,821
Patented Jan. 2, 1968

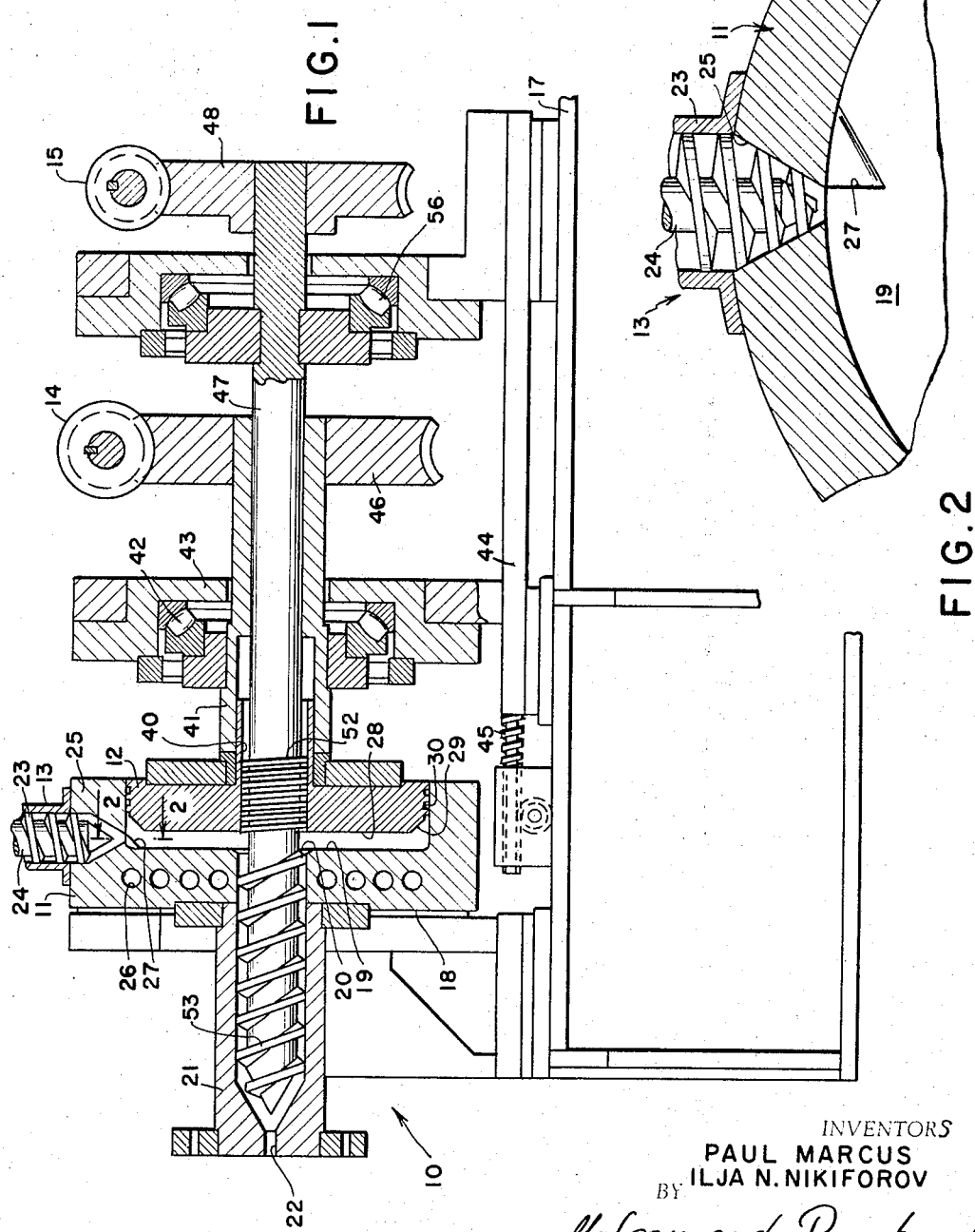

3,360,821
ELASTIC MELT EXTRUDER WITH
PERIPHERAL FEED
Paul Marcus, Pearl River, N.Y., and Ilja N. Nikiforov,
Livingston, N.J., assignors to KPT Mfg. Co., Roseland,
N.J., a corporation of Delaware
Filed May 8, 1964, Ser. No. 365,977
3 Claims. (Cl. 18—12)

ABSTRACT OF THE DISCLOSURE

An improved elastic melt extruder comprised of a hollow stator and a rotor positioned therein and having an improved feed arrangement is shown. Plastic charge materials which are plasticated between confronting relatively rotating surfaces of the rotor and stator are introduced via a feed aperture in the sidewall of the stator to the space between the confronting surfaces. A deflector located on the side of the feed aperture facing advancing plasticated material shields the feed aperture from plasticated material thereby avoiding clogging of the aperture.

---

This invention relates to elastic melt extrusion and in particular provides a method and apparatus for mixing, plasticating, and extruding or otherwise shaping materials, such as thermoplastic and thermosetting resins, elastomers and the like which can be plasticated by mechanical working, at times with the addition of heat, to render them visco-elastic in which state they can be shaped to a desired form through application of pressure, as by extrusion or molding, and from which visco-elastic state they can be subsequently solidified retaining such form.

Elastic melt extrusion, as hereinafter employed, is intended to refer to the plasticating of such materials to render them visco-elastic and to the subsequent discharge of such plasticated visco-elastic materials which is effected by subjecting such materials to torsional shear, that is, shear between closely spaced confronting surfaces which are rotated one relative to the other about an axis which is at an angle to such surfaces. When certain materials, such as resins and elastomers, are thus introduced between closely spaced relatively rotating surfaces, such materials are rapidly plasticated by the shear imposed upon them and are efficiently blended and transformed into a homogeneous visco-elastic state. At the same time, the torsional shear imposed upon them when plasticated and visco-elastic exhibits a secondary effect sometimes known as the "Weissenberg effect" (Nature, 159, 310–311 [1947]). This effect is demonstrable as a force normal to the direction of shear tending to cause flow of the visco-elastic material toward the axis of rotation of the rotating surfaces.

In elastic melt extrusion the device, i.e. elastic melt extruder, in which the materials are plasticated is provided with a discharge orifice in one of the two surfaces between which such materials are subjected to torsional shear. Such orifice is located relatively close to or coincident with the axis of rotation, such that the force created by the Weissenberg effect causes the materials rendered visco-elastic in the device to be discharged, i.e. extruded, through the discharge orifice.

It is generally an overall object of this invention to provide elastic melt extrusion methods and apparatus of the elastic melt type which will generally permit utilizing the advantage of the highly efficient plasticating action of such extruders and extrusion methods while obviating problems heretofore experienced utilizing such extruders and methods.

Thus it has been found that the simple employment of relatively rotating bodies in an elastic melt extruder which produces the Weissenberg effect in visco-elastic materials is highly suitable for plasticating such materials, considerable problems have been experienced in charging materials to elastic melt extruders. While gravity feed to a location adjacent the peripheries of the confronting surfaces of the elastic melt extruder is often desirable, such a feed can be accomplished in practice only at extremely slow rates and consequently it has been found necessary to force feed even granular materials which are to be plasticated in an elastic melt extruder. Moreover, such forced feeds, typically screw conveyors, have generally been characterized by a tendency of the charge material, as it melts or otherwise becomes fluent during initial stages of plastication, to gum and clog the feeding apertures and to work backwardly through the seals at the periphery of the confronting surfaces of the extruder and similarly to clog these.

In accordance with this invention an elastic melt extruder is provided in which a pair of confronting surfaces are formed, one of which is usually on a fixed construction which for convenience can be designated the stator and the other of which is usually on a rotatable construction and hence for convenience can be designated a rotor. Generally the peripheral space between the confronting surfaces of the stator and rotor is closed to prevent loss of material fed between the confronting surfaces and a feed aperture is located through such peripheral closure. In accordance with the present invention a deflector is affixed to the stator immediately adjacent the feed aperture such that it is positioned in the path of material carried by the rotor about the chamber formed between the confronting surfaces thus to deflect material in the chamber away from the feed aperture. In this manner fresh charge can be introduced by gravity or by forced feed to the feed aperture and thence discharge into the chamber between the relatively rotating confronting surfaces and yet contact with moving fluent materials in the chamber with such fresh charge at the feed aperture is avoided until such charge materials are carried by motion of the motor away from the feed aperture.

For a more complete understanding of the practical application of my invention reference is made to the appended drawings in which:

FIGURE 1 is a vertical section of an elastic melt extruder in accordance with this invention, and FIGURE 2 is an enlarged fragmentary section taken at line 2—2 in FIGURE 1.

Referring more specifically to FIGURE 1 the reference number 10 designates an elastic melt extruder in accordance with this invention which generally includes a stator 11, rotor 12, feed arrangement 13, a first drive mechanism 14 and a second drive mechanism 15.

Stator 11 is of generally cylindrical shape and is mounted on a platform 17 with its axis in horizontal position. Stator 11, which is hollow, is closed at one end, as indicated by the reference number 18, while its opposite open end receives rotor 12. The inner surface of closed end 18 is formed as a flat annular surface 19 which forms one of the working surfaces of elastic melt extruder 10. The central aperture of surface 19, designated by the reference number 20, is a discharge orifice from extruder 10. Orifice 20 leads into an extended sleeve 21 projecting coaxially from closed end 18 which is adapted at its end remote from the main portion of stator 11 for connection to an extrusion die or the like. Discharge orifice 20 extends deeply into sleeve 21 terminating in a tapered end opening 22 at the end of sleeve 21 remote from the remainder of stator 11.

Screw feed device 13, which at its end remote from extruder 10 communicates with a storage bin for extrusion charge stock, includes a barrel 23 housing a screw 24 suitable for advancing charge material from the storage bin to the other end of barrel 23, which end is bolted to the sidewall of stator 11 where barrel 23 communicates at such end with a feed aperture 25 in the sidewall of stator 11 immediately adjacent the periphery of inside 19 of end wall 18.

End wall 18 of stator 11 is interiorly bored to provide a series of interconnecting passages 26 which can be externally connected to permit circulation of a fluid heat transfer medium through end wall 18 for the purpose of adding or removing heat to such wall. Stator 11 is also provided with a wedge-shaped cam 27 (see also FIGURE 2) which is essentially a tetrahedron having one triangular face slightly curved and positioned butting against the inside cylindrical sidewall of stator 11 immediately adjacent opening 25. A second, essentially triangular face of cam 27 is positioned abutting end surface 19 such that a third triangular face is tangent to opening 22, on its right side as seen in FIGURE 2, while the fourth triangular face of cam 27 faces the interior of stator 11 in a direction, as will be later described, such that flow of material in stator 11 between end wall 19 and rotor 12 generally tends to impinge on such fourth surface thereby deflecting flow away from the opening of aperture 25 into the interior of stator 11.

Rotor 12 is of generally cylindrical construction and fits with its cylindrical sidewall slidably received within the inside sidewall of stator 11 to permit rotation of rotor 12 on an axis coincident with that of stator 11. The end surface of rotor 12 facing inner end wall 19 of stator 11 and designated by the reference number 28 is generally flat and constitutes a working surface confronting working surface 19 with which it forms basic elastic melt extrusion chamber.

Peripherally face 28 of rotor 12 is tapered, as indicated at 29. Rotor 12 is further provided with a low pitch peripheral thread 30 extending from its end remote from face 28 up to tapered, marginal edge 29 of face 28, which thread when rotor 12 is rotating in its intended manner serves as a seal trapping any material tending to flow backwardly between the sidewalls of rotor 12 and stator 11 in a manner such that loss or accumulation of materail between such sidewalls is substantially prevented.

Rotor 12 is provided with an axial bore 40 generally of the same diameter as the bore of discharge orifice 20 with which it is aligned. The end of rotor 12 remote from face 28 is mounted on a hollow shaft 41 positioned coaxially with respect to rotor 12 which is retained in a thrust bearing 42 housed in an annular plate 43 mounted on a guide track 44. Track 44 is secured to platform 17 to permit plate 43 and hence rotor 12 to move in a direction parallel to their common axis. A screw mechanism 45 is provided to control movement of plate 43 on guide track 44 and thus adjust the clearance between working surfaces 19 and 28.

First drive mechanism 14 includes a suitable drive motor and gear transmission terminating in a gear 46 affixed to shaft 41, and drive mechanism 14 is generally mounted for movement on guide track 44 along with retaining plate 43 such that drive mechanism 14 controls rotation of rotor 12 regardless of the position of the latter with respect to stator 11.

An elongated shaft 47 is provided extending through shaft 41 and bore 40 in rotor 12 and at one end extending deeply into discharge orifice sleeve 21 through orifice 20. Shaft 47 is retained in a thrust bearing 56, which is also mounted on guide track 44 for movement with rotor 12. At its end remote from discharge sleeve 21 shaft 47 is engaged with second drive mechanism 15, which is also mounted for sliding movement on guide track 44 together with first drive mechanism 14 and rotor 12. More specifically drive mechanism 15 includes a suitable motor and gear transmission terminating in a gear 48 affixed to the end of shaft 47 to rotate shaft 47 with it and thereby controlling rotation of shaft 47 independently of rotation of rotor 12.

Where it passes through rotor 12, shaft 47 is provided with a seal in the form of a single thread 52 having a pitch selected with reference to the generally intended relative speeds of rotor 12 and shaft 47 such that any leakage from the interior of extruder 10 between rotor 12 and shaft 47 is forced back between surfaces 19 and 28. In discharge orifice 20 and continuing into discharge sleeve 21, shaft 47 is provided with a steep pitched thread 53 the direction of pitch of which is selected with reference to the desired direction of rotation of shaft 47 as to direct material from extruder 10 out through discharge orifice 20 toward outlet 22.

In operation the bin supplying feed screw 13 is charged with an appropriate thermoplastic or thermosetting resinous, elastomeric, or other feed, material, and fluid heat transfer medium is flowed through passageways 26 at an appropriate rate and temperature to add or extract heat during operation, as deired. Sleeve 21 is connected at its discharge outlet 22 to an appropriate extrusion die or other device into which the plasticated feed material is to be discharged.

If it is desired to supply heat during plasticating operation it can be desirable to preheat rotor 12 by adjusting screw mechanism 45 to bring rotor face 28 into contact with face 19 of stator 11 a sufficient period of time to raise the temperature of face 28 of rotor 12 to the desired level by conduction from heated stator 11. Note, it is also possible to provide rotor 12 with separate control of internal heating or cooling as for example described in copending Marcus et al. application Ser. No. 365,873, filed May 8, 1964, entitled "Elastic Melt Extruder Having Internal Feed Conveyor" now abandoned in favor of Marcus et al. application Ser. No. 613,372, filed Dec. 27, 1966.

When rotor 12 is at the desired temperature, if such a preheating step is employed, or in any event when operation is to commence, feed screw 45 is adjusted to provide the desired clearance between surfaces 19 and 28, which usually is on the order of $\frac{1}{16}$ inch to 1½ inches. Note that the position of the end of shaft 47 in sleeve 21 is moved axially upon adjustment of mechanism 45 and that therefore the relative position of shaft 47 with respect to rotor 12 should be such to permit adequate clearance for shaft 47 at sleeve 21 when rotor 12 is brought to butting contact with face 19 of stator 11.

As described more fully in copending Marcus et al. application Ser. No. 365,975, filed May 8, 1964, entitled "Elastic Melt Extruder with Pressured Dicharge" now abandoned in favor of Marcus et al., application Ser. No. 605,086, filed Dec. 27, 1966, the speed of rotor 12 and the speed of shaft 47 are predetermined through separate control of drive mechanisms 14 and 15 (each in a counterclockwise direction as seen in FIGURE 2) in relation to the material charged in operation of screw feed device 13 to produce plastication of the charge material between faces 19 and 28 to render the material viscoelastic and thence to extrude the material outwardly through orifice 20 and outlet 22 at the desired pressure.

In accordance with this invention difficulties previously experienced using a peripheral feed aperture 28, as described in FIGURE 1, are obviated by the use of deflector cam 27 which functions to prevent contact of charge material entering the space between surfaces 19 and 28 with material between such spaces which have been previously rendered fluent until the fresh charge has been swept away from feed aperture 25 and thus agglomeration with such fluent material cannot block the entrance of feed aperture 25 between confronting working surfaces.

More specifically recognizing that the problem of agglomeration at a feed aperture entering a chamber, such as that defined between confronting working surfaces 19 and 28, is a problem caused by contact of material previously rendered fluent with fresh charge, in accordance with this invention wedge-shaped cam 27 is positioned relative to feed aperture 25 in a manner deflecting radially inwardly material previously rendered fluent as this is swept by the action of rotor 12 past aperture 25. Thus a void space beneath aperture 25 is produced by the reaction of cam 27 with the material being swept past it, into which void the fresh charge is forced by screw 24. Contact with such fresh material does not therefore occur until rotor 12 has carried the fresh material away from the entrance of aperture 25 into the chamber between confronting working surfaces of the extruder. Gravity feed is also speeded up by the employment of such a deflector as the feed aperture is unobstructed.

For more specific consideration of details involving temperature control in elastic melt extruders, reference is made to copending Marcus et al. application entitled "Elastic Melt Extruder Having Internal Feed Conveyor," referred to above and to copending Marcus et al. application entitled "Elastic Melt Extruder With Pressured Discharge," referred to above. The latter application also discusses venting of volatiles which frequently is an important consideration in the use of elastic melt extruders.

We claim:

1. In an elastic melt extruder which includes means defining a first surface, means defining a second surface positioned closely spaced to and confronting said first surface, means for rotating said surfaces one relative to the other about an axis at an angle to said surfaces and means in one of said surfaces defining a discharge orifice from the space between said surfaces proximate to said axis of rotation, the improvement which includes means peripherally enclosing the space between said surfaces, means cooperating with said last named means defining a feed aperture in the periphery of said space between said surfaces, and deflector means positioned adjacent said feed aperture on the side thereof facing advancing plasticated material impelled by the rotation of said confronting surfaces, said deflector means shielding said feed aperture from said plasticated material and creating a zone at said feed aperture which is free of plasticated material.

2. In an elastic melt extruder which includes a hollow stator having a sidewall and a closed end, a rotor coaxially positioned in said stator with an end surface of said rotor closely spaced from and confronting the surface of the closed end of said stator, means for rotating said rotor within said stator about their common axis and means defining a discharge orifice in said stator proximate to said axis, the improvement which includes means defining a feed aperture in the sidewall of said stator adjacent the periphery of the space between said confronting end surface, and a deflector on said stator between said stator and rotor adjacent said aperture on the side thereof facing advancing plasticated material impelled by the rotation of said rotor and stator, said deflector shielding said feed aperture from said plasticated material and creating a zone at said feed aperture which is free of plasticated material.

3. The improvement according to claim 2 in which said deflector is wedge-shaped, one surface thereof abutting said sidewall, another surface thereof abutting the surface of the closed end of said stator and the wedge surface of said deflector completely shielding said feed aperture from advancing plasticated material.

References Cited

UNITED STATES PATENTS

| | | | |
|---|---|---|---|
| 3,032,814 | 5/1962 | Miner | 18—12 |
| 3,262,154 | 7/1966 | Valyi | 18—12 |

WILLIAM J. STEPHENSON, *Primary Examiner.*